Figures 1, 2:
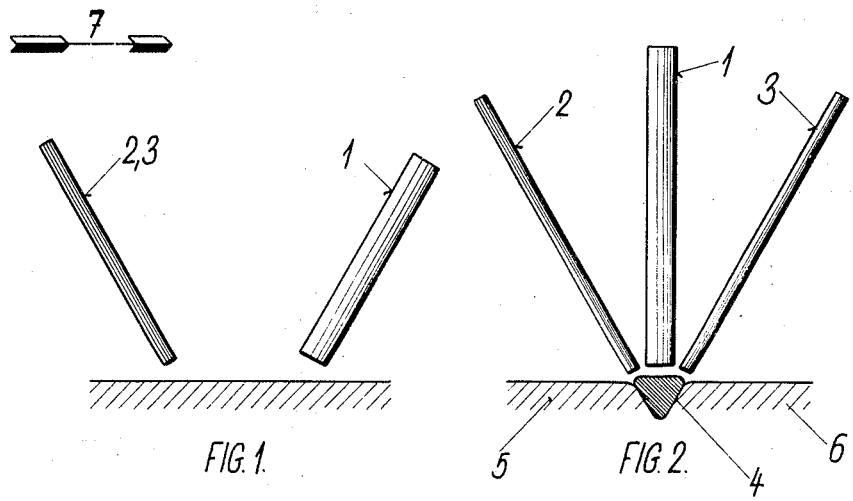

April 29, 1958  Z. DUBEN  2,832,880
PROCESS OF DEPOSITING MOLTEN METAL FROM METAL ELECTRODES
ON TO A METALLIC BODY, PARTICULARLY
A PROCESS FOR ELECTRIC WELDING
Filed July 31, 1956

INVENTOR.
Zdeněk Duben
BY

2,832,880

PROCESS OF DEPOSITING MOLTEN METAL FROM METAL ELECTRODES ON TO A METALLIC BODY, PARTICULARLY A PROCESS FOR ELECTRIC WELDING

Zdeněk Duben, Chotebor, Czechoslovakia, assignor of one-half to Výzkummý ústav svařovacích strojů a technologie svařování, Prague, Czechoslovakia Application July 31, 1956, Serial No. 601,232

3 Claims. (Cl. 219—73)

There are known processes for depositing molten metal from a metal electrode onto a metallic body used particularly for electric welding, and wherein, on said body, a mass of unbonded, finely divided material is deposited which does not contain any substances which would evolve any deleterious amounts of gas during welding and, by contacting and preferably submerging an end of the metal electrode in said mass, a portion of said mass near the electrode is melted and welding heat is generated by passing electric current from the electrode to said body. The unbonded material performs thereby the protective function of a flux.

The results obtained with this welding process were superior to the commonly used welding processes with the electric arc, permitting welding of substantially thick plates in a single operation at speeds which are prohibitive for normal arc welding processes. The welding speed is however also limited for this process. If we step up the welding speed, we receive a rather narrow welding seam with indentations and a porous aspect. The reason for that is an insufficient heating of the welded bodies adjacent to the deposited metal and a quick solidifying of this deposited metal.

It has been proposed to overcome these drawbacks by placing two or three electrodes in succession along the seam. Such plural electrodes have been supplied with electric current either from the same source or from individual sources of electric current (so called welding with electrodes in tandem). When the electrodes were fed from the same source, only a small increase of welding speed was possible. When they had individual sources, a larger increase of the welding speed has been achieved.

The failure of these methods to provide a completely satisfactory result is due to the inefficient use of the generated heat energy. When a single electrode is used, it produces a welding seam which becomes too narrow when the welding speed is greatly increased. The deposited metal solidifies too quickly and is not perfectly fused with the welded bodies. When several electrodes are used in succession, the heat which they generate is is equally limited to the narrow strip of the seam as formed by the first electrode. A considerable amount of electric energy is required to extend with this method the heating to areas where the heat is required, i. e. to widen the heated area by increasing the length of the welding arc. The heat dissipated by conduction into a large area, in response to increasing excessively the supplied electric energy, causes undesirable stresses in the welded bodies and the increased length of the arc also results in an increased consumption of welding flux.

It is an object of the present invention to eliminate these drawbacks and provide a process for depositing metal onto a metallic body and particularly a welding process, with which the speed of welding can be increased considerably, maintaining at the same time a high quality of the welded seam without producing undesirable stresses in the welded bodies and without waste of electric energy and of welding flux.

According to the invention the first electrode which deposits the molten metal into the seam is followed by further electrodes, which are spaced laterally from the line of symmetry of the welding seam, along which the first electrode proceeds. Thus the parts of the welded bodies which are close to the welded seam are more intensively heated by electric current so that a perfect shape of the seam is achieved. The heat is thereby only generated at places where it is really required and its magnitude may be easily controlled, particularly if each electrode is fed from its own source of electric current, so that the amount of dissipated heat may be regulated and limited to places where it is needed. The consumption of electric energy may be at the same time kept within the lowest possible limits and the consumption of flux is equally rather low. The welding speed may be increased many times with respect to the presently used methods, particularly when welding thicker plates or thicker structural elements.

Figure 3:
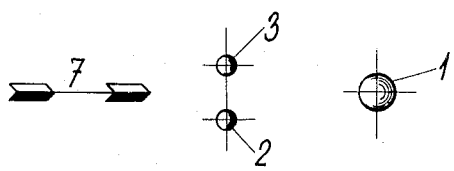
Figure 4:
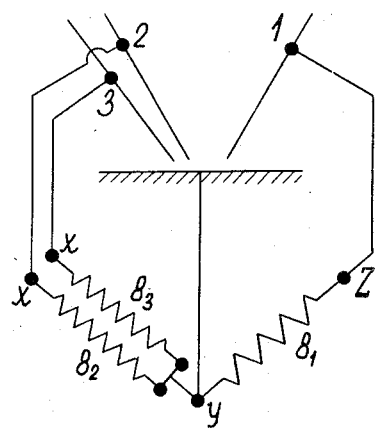

An example of an arrangement of electrodes as used with the process according to the invention is shown in the accompanying drawing, where Fig. 1 is a side view of the electrodes, Fig. 2 a front view, Fig. 3 a top view, showing the places where the electrodes act and Fig. 4 a schematic wiring diagram for the supply of the electrodes with electric current.

Referring to Figs. 1, 2 and 3 the electrode 1 is the main electrode, which deposits the metal into the seam 4 between the bodies 5 and 6 and which proceeds along the seam in the direction of the arrow 7 (see Figs. 1 and 3). Behind this electrode, spaced laterally a predetermined distance from the line of symmetry of the welding seam along which the electrode 1 proceeds, are auxiliary electrodes 2 and 3. It is advantageous to feed these electrodes with electric current from individual sources, to be better able to control the distribution of heat. This may be for instance accomplished in the manner indicated in Fig. 4, where each of the electrodes 1, 2 and 3 has its individual secondary winding $8_1$, $8_2$ and $8_3$ of the welding transformer.

The electrode 1 is generally of larger diameter than the electrodes 2 and 3. The electrode 1 may be replaced by a number of electrodes in line or at a certain distance from the line of symmetry of the welding seam, and which are supplied either from the same or from individual sources of electric current thereby to obtain better conditions for the generation of molten metal and a wider heated area. There also may be more than two electrodes 2 and 3. Good results have been obtained with two electrodes 1 at a certain distance from the line of symmetry of the welding seam, followed by two electrodes 2 and 3 respectively arranged in a similar way.

With an arrangement as described above, welding speeds of 400 ft./hour have been achieved when welding sheet iron of a thickness of ½ inch with a gap of 3/16" between these sheets, using a single main welding rod or electrode 1 of a diameter of 3/16" and two auxiliary welding rods or electrodes 2 and 3 with a diameter of 1/12". The consumption of electric energy has been 1650 amp. at 42–44 v. for electrode 1 and 720 amp. at 40 v. for each of the electrodes 2 and 3. The width of the welding seam has been about ¾". The sheets were ideally fused and the root of the weld perfect so that no further operations were required.

The process according to the invention allows a very efficient control of the stability of the whole welding process at increased welding speeds for different welding operations. Its main use is for automatic welding, namely for the welding of thicker sheets, for welding of pipes, beams and similar structural elements.

What I claim is:

1. A process for electric welding of a metallic body along a seam; comprising depositing in the seam a mass of unbonded material which has the protective properties of a welding flux, moving at least one leading electrode along the seam while submerged in said mass, passing electric current from said leading electrode to the body to deposit fused electrode metal from the leading electrode in the seam, allowing at least the major part of the deposited metal to solidify, and then subjecting the opposite side margins of the deposited metal to the action of an electric arc by at least two additional electrodes which trail the leading electrode and are in transversely spaced relation to the line of symmetry of the seam.

2. A process for electric welding of a metallic body along a seam as in claim 1; wherein said leading and additional electrodes are individually supplied with welding current so that the leading electrode primarily deposits the metal and the additional electrodes maintain the lateral boundaries of the seam at elevated temperatures.

3. A process for electric welding of a metallic body along a seam as in claim 1; wherein a plurality of transversely spaced apart leading electrodes are moved along the seam, thereby to deposit metal over a seam of relatively large width.

References Cited in the file of this patent

UNITED STATES PATENTS

| | | |
|---|---|---|
| 2,320,824 | Landis et al. | June 1, 1943 |
| 2,479,087 | Steward | Aug. 16, 1949 |
| 2,620,423 | Komers et al. | Dec. 2, 1952 |
| 2,654,015 | Landis et al. | Sept. 29, 1953 |

FOREIGN PATENTS

| | | |
|---|---|---|
| 644,758 | France | June 18, 1928 |